U.S. Patent Number: 5,471,730

United States Patent [19]
Sackett

[11] Patent Number: 5,471,730
[45] Date of Patent: Dec. 5, 1995

[54] METHOD FOR REFURBISHING WORN TURRET PUNCH PRESS BORES

[76] Inventor: Mark Sackett, 5975 Meadowcreek Dr., Unit #11, Milford, Ohio 45150

[21] Appl. No.: 347,044

[22] Filed: Nov. 30, 1994

[51] Int. Cl.[6] ............................................. B23P 6/00
[52] U.S. Cl. ............................. 29/402.12; 29/402.11; 29/402.14; 29/402.19; 408/81
[58] Field of Search ........................ 29/402.01, 402.03, 29/402.04, 402.05, 402.06, 402.08, 402.09, 402.11, 402.12, 402.14, 402.15, 402.19; 408/80, 81, 82, 83.5, 708, 709

[56] References Cited

U.S. PATENT DOCUMENTS

| | | | |
|---|---|---|---|
| 1,126,715 | 2/1915 | Cuyler | 408/82 |
| 1,552,484 | 9/1925 | Howser | 408/83.5 |
| 1,789,080 | 1/1931 | Neldner | 408/83.5 |
| 1,790,378 | 1/1931 | Howser | 408/83.5 |
| 4,240,314 | 12/1980 | Teeslink . | |
| 4,756,630 | 7/1988 | Teeslink . | |
| 4,862,782 | 9/1989 | Ernst . | |
| 5,056,392 | 10/1991 | Johnson, et al. . | |
| 5,146,817 | 9/1992 | Bickle | 408/81 |
| 5,263,237 | 11/1993 | Gallant et al. . | |
| 5,267,384 | 12/1993 | Teeslink . | |

Primary Examiner—David P. Bryant
Attorney, Agent, or Firm—Wood, Herron & Evans

[57] ABSTRACT

A method for restoring worn bores in a turret or other tool punch press is disclosed. The worn turret bore is refurbished by using a special boring bar and drive mechanism to enlarge the diameter of the worn section of the bore. A cylindrical sleeve is inserted into the re-bored bore and secured therein. The internal diameter of the sleeve has been machined to correspond to the unworn internal diameter of the bore. The outside diameter of the sleeve is sized to provide a slipfit with the enlarged diameter of the bore. Axial alignment of the worn turret bore is restored according to the invention by locating the boring bar along an axial centerline of an unworn region of the bore. The unworn region of the bore is the lower portion thereof and is the same diameter and in alignment with bore as originally machined. The boring bar utilizes the unworn portion of the bore as a reference when re-boring the worn portion of the bore.

25 Claims, 5 Drawing Sheets

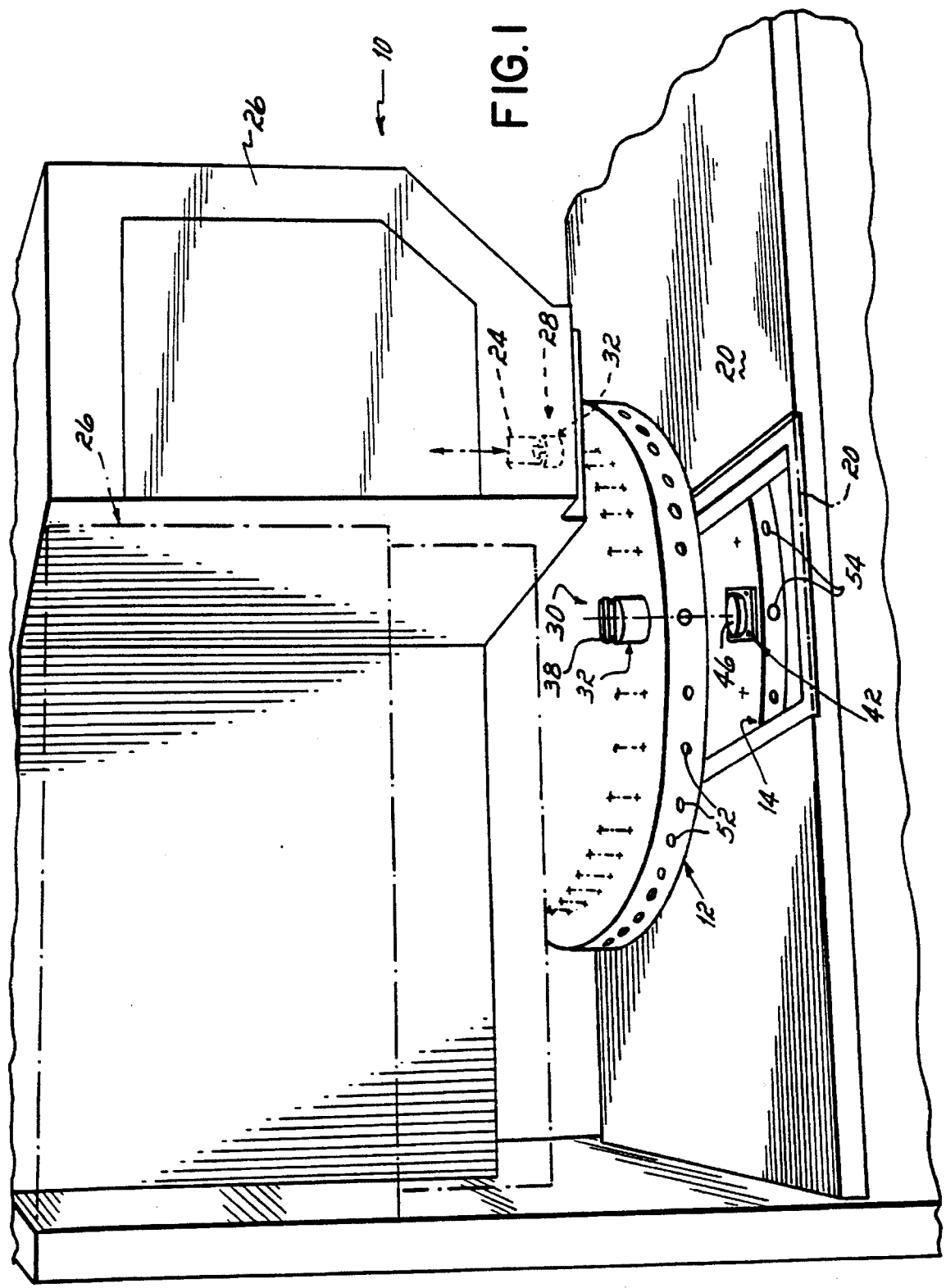

METHOD FOR REFURBISHING WORN TURRET PUNCH PRESS BORES

BACKGROUND OF THE INVENTION

This invention relates to turret punch presses, and more particularly to an improved method for refurbishing worn punch holder guide bores of a turret punch press and other similar machine tools.

A turret punch press operates by positioning a work piece, such as a piece of sheet metal, to be punched within a gap between generally round and horizontally spaced turrets. Each turret includes a number of bores proximate the perimeter of the turret. A bore in the upper turret has a correspondingly sized and configured bore in the lower turret. A punch holder is positioned within a bore on the upper turret and a die holder is positioned within the corresponding bore on the lower turret. When the corresponding upper and lower bores are rotated to a punch station on the punch press, a generally vertical reciprocal ram is actuated to engage a punch held by the punch holder. The ram forces the punch with the punch holder and the bore downwardly to engage the work piece. A die is secured within the die holder and the lower bore and cooperates with the punch being forced downwardly by the ram to thereby punch a specific configuration or design in the work piece. Repeated operation by the ram upon selected punches and corresponding dies in the turrets produces a punched and configured work piece as desired.

The punching operation in a turret punch press optimally requires precise axial alignment of the respective die and die holder in the lower turret, the corresponding punch and punch holder in the upper turret and, to a lesser degree, the ram. The die, die holder, punch, punch holder and ram are all preferably aligned along an axis referred to herein as the "punch axis" and the terms axial, axial alignment, axial misalignment, or derivations thereof are in reference to the punch axis throughout this document.

The repeated and forceful axial motion of the punch holder within the bore typically produces non-uniform wear on the sidewalls of the bore in the upper turret. With repeated use and over time, the upper bore is worn so that the critical axial alignment between the punch holder and the die holder is diminished and, thus, axial alignment between the punch and die is also diminished.

Specific punching operations such as "nibbling" and the rapid off-center forces delivered to the punch holder as a result of such operations tend to increase the rate of wear on the upper bore. The worn bore fails to provide a rigid guide for the punch holder and an accurate alignment of the punch with the die during the punching cycle. As a result, work piece quality is diminished and excessive tool wear or breakage is possible. Therefore, worn turret bores must be repeatedly monitored and repaired in order to maintain consistently high work piece quality.

One alternative to repairing the worn turret bores is to replace both the worn upper and mating lower turrets. This alternative is generally considered to be the most effective; however, it is extremely costly, approximately 940,000 to 965,000, and entails long lead times, approximately four to six months, for supply of the necessary parts and materials. Furthermore, replacing the upper and lower turrets results in excessive downtime, approximately two to three weeks, for installation of the turrets on the punch press.

The lower turret, although typically having bores which are less worn than the upper turret, is usually replaced along with the upper turret so that the mating bores of the lower and upper turret are compatible when they are installed on the machine. The requirement of replacing both the upper and lower turrets adds substantially more cost to the repair as well as increasing the time required for the repairs.

Another alternative for the repair of worn turret bores is to repair only the worn bores in the upper turret. Advantages associated with such repairs include avoiding the substantial disassembly of the press and resulting excessive downtime associated with replacing both the turrets. As a result, repairing only the worn bores in the upper turret provides a more durable and substantially less costly repair process than replacing the turrets.

Several alternative methods for repairing worn upper turret bores have been attempted over the years with varying degrees of success. One such method is disclosed in U.S. Pat. No. 4,240,314. This patent is directed to a centering and wear compensating means for punch presses and the like and discloses inserting plugs of resilient long-wearing, self-lubricating material into equi-angularly spaced bores of uniform length provided in the wall of a turret bore. These plugs are curved on one face to conform to the punch holder which reciprocates within the bore. Additionally, the plugs are chamfered for easy compressibility as the punch holder is positioned within the turret bore containing the plugs. The method of repairing worn turret bores according to this patent includes cutting at least three equi-angularly spaced wells of uniform depth in the sidewall of the turret bore. These wells extend into the turret from the sidewall of the turret bore in a direction substantially normal to the axis of the turret bore.

Problems associated with repairing worn turret bores according to U.S. Pat. No. 4,240,314 include the failure of the plugs inserted into the wells. The plugs tend to compress and deform under heavy loads thereby allowing the punch holder to deflect resulting in off-center punching, especially during nibbling operations. The plugs provide only a small bearing surface to support the punch holder thereby magnifying the problem of punch holder deflection under loads. Although in practice plastic plugs may improve the support of the punch holder after initial installation, the plugs quickly wear down and must be frequently replaced in due course.

Another alternative to repairing worn turret bores is disclosed in U.S. Pat. No. 4,756,630. This patent is directed to a punch holder guide which includes a plurality of preferably plastic wear strips which are secured into dove-tailed longitudinal keyways broached into the sidewall of the turret bore. The wear strips are installed within the dove-tailed keyways the entire length of the upper turret bore. The wear strips protrude inwardly from the cylindrical sidewall of the bore to create frictional contact between the strips and the punch holder during operation and thereby prevent contact between the punch holder and the sidewall of the bore.

Although the method disclosed in U.S. Pat. No. 4,756,630 provides enlarged bearing surfaces and support for the punch holder during operation, deflection of the wear strips during off-center punching produces misalignment of the punch holder, and subsequently the punch and die, because the wear strips fail to maintain a rigid support surface. The plastic wear strips are also subject to rapid wear under medium to heavy production loads of the punch press and all too soon must be replaced.

Another problem with the repair processes described in both U.S. Pat. Nos. 4,756,630 and 4,240,314 is that neither method includes a means for obtaining support for the punch holder along the centerline of the original bore. As a result, final alignment between punch and die is only randomly obtained even when the repairs are initially complete and in their most effective state prior to further use and wear.

Another method for repairing worn turret bores is disclosed in U.S. Pat. No. 5,263,237 which is directed to a method for restoring punch and die alignment for a turret punch press. The method disclosed in this patent includes a process for correcting both the angular misalignment of a turret bore relative to a reference axis and for correcting radial misalignment of a turret bore relative to a second reference axis. An initial step of the process disclosed in this patent involves the detection of any misalignment between the upper turret apertures and a point on the turret punch press described as the punch axis which is determined by the centerline of the ram aperture. This process involves removal of the ram, ram bushing, dies and die holders, and punches and punch holders. A gauge rod and dial indicator is then mounted on the turret to tram the inside diameter of either the upper turret punch guide bore or the lower turret die locating bore. A method is described for enlarging the guide bores in the upper turret using a boring bar that corrects any detected misalignment with respect to the ram aperture and the lower turret bore which have been aligned to create the reference punch axis.

The repair method according to U.S. Pat. No. 5,263,237 includes fixedly securing a cutting tool to the boring bar that is guided and centered on the punch axis by means of a fixed bushing mounted in the lower turret die holder and a bushing assembly mounted in the ram bushing aperture. The boring bar and cutting tool are coupled to a drive motor that is mounted to an extreme upper shelf of the punch press frame. The mounting of the drive motor necessitates removal of the clutch and brake assemblies, a flywheel and a crankshaft and related assemblies of the punch press at the punch station. Once the worn turret bore is re-bored with respect to the reference punch axis, an elongated cylindrical sleeve insert is positioned into the bore and extends the entire length of the bore. The inside diameter of the sleeve is sized for close fit relationship to a standard punch holder and the outer diameter of the sleeve is sized for close fitting tolerance to the enlarged turret bore in which it is inserted. The sleeve is fabricated from a durable metal which is hardened to at least the hardness of the punch holder.

'Problems associated with the repair process described in U.S. Pat. No. 5,263,237 include the complicated steps of generating a reference axis which includes the upper and lower turret bores and the ram bushing aperture. Additionally, the re-boring process is accomplished at the punch station and requires major disassembly and reassembly of the punch press to complete the repairs. The major disassembly and reassembly of the punch press necessitates extensive downtime of the punch press and results in a cost ineffective repair process.

Another method is disclosed in U.S. Pat. No. 5,267,384 which is directed to a method for providing a punch holder body guide for punch presses. The method disclosed in this patent includes inserting a sleeve into a worn turret bore so that the punch holder is accurately centered and guided within the sleeved bore. The outer diameter of the sleeve is larger than the diameter of the bore, thereby requiring that the sleeve be compressed prior to insertion within the bore and then allowed to expand into an interference fit within the worn bore. Prior to compression and insertion within the bore, the sleeve is machined to the appropriate dimensions within a bore simulating holding mandrel. The sleeve may also need to be shrunk prior to insertion into the bore simulating holding mandrel. The sleeve is shrunk by immersion into a liquid nitrogen bath. Once shrunk and machined, the sleeve is inserted into an enlarged bore to accommodate the dimensions of the sleeve. After the sleeve is inserted into the enlarged bore, it is allowed to warm to ambient temperature and is elastically compressed and bound into interference fit within the bore and is virtually irremovable therefrom.

Problems associated with the method disclosed in U.S. Pat. No. 5,267,384 include the failure to account for any axial misalignment of the worn turret bore. For an effective repair, the sleeve must be in axial alignment with the original bore and/or the die locating bore in the lower turret. In addition, the interference fitting of the sleeve into the enlarged bore requires unnecessary cost and manufacturing of the sleeve, and an unnecessarily difficult and excessively time consuming installation process. In addition, the requirement of using a simulated mandrel to machine the sleeve is an unnecessarily complicated and time intensive task. The refurbishing process described in this patent increases both cost and machine downtime to effect worn turret bore repairs. Furthermore, future replacement of the sleeves is problematic, if possible at all, due to the interference fit within the bore.

As can be seen from the herein described review of prior attempts to refurbish worn turret bores, there is still a need for an effective, cost efficient method for refurbishing worn turret bores.

SUMMARY OF THE INVENTION

It has been a primary objective of this invention to provide an improved method for repairing worn turret bores without replacing the entire turret.

It has been a further objective of this invention to provide such a method which requires a minimal amount of downtime and disassembly of the turret punch press.

It has been a further objective to provide such a method which results in an effective and long-lasting repair of the turret punch press and restores the punch press to the axial alignment of the punch and punch holder with respect to the die and die holder that the punch press manufacturer provided.

It has been a still further objective to provide such a method which enables the refurbished turret bore to be subsequently repaired with a minimal amount of cost, downtime, and effort.

These and other objectives of the invention have been attained by a process in which the worn born on an upper turret of a punch press is re-bored so as to have a center line which is colinear with the original configuration of the turret bore. A sleeve is then inserted and secured within the re-bored bore so as to provide the appropriately configured and dimensioned bore for the punch holder.

One important aspect of the process according to this invention is the identification of the fact that the lower circumferential region, approximately one-half inch, of the upper turret bore is not worn in the punching operation. The wear in the upper bore resulting from the repeated punching operations is limited to the region of the upper turret bore other than the lower approximately one-half inch. The unworn or "virgin" region of the upper turret bore is not used by the punch holder and, therefore, is the same bore diameter as when the turret was originally made and machined to specifications. As a result, this "virgin" or unworn region of the upper bore is used according to this invention as a reference when refurbishing the worn bore to the required specifications. In that the worn bore is refurbished with reference to the original configuration of the bore as provided by the punch press or turret manufacturer, the repair process of this invention provides axial alignment to the degree that the manufacturer originally provided.

A first step in the repair of a worn bore according to this invention is the location of the bore to be refurbished to a tool change position which is away from the punch station where the ram is located and the punching operation conducted, For example, in punch presses built by Wiedemann (Warner and Swasey), the tool change position is approximately 90° from the ram or punch station. A boring bar, which is specially sized for the diameter of the bore to be repaired, is mounted vertically within the bore located at the tool change station. The boring bar is positioned and supported by a support structure secured to the upper turret. An upper support is secured onto the upper face of the upper turret to give support and rigidity to the boring bar during the boring operation. A bottom support is secured to the bottom face of the upper turret and centers the boring bar with respect to the virgin portion of the bore. The bottom surface of the upper turret is used as a reference so that the boring bar is positioned in the support structure perpendicularly with respect to the turret. The unworn region of the upper turret bore provides a reference for the axial alignment of the boring bar. In combination, the upper and lower supports align the boring bar along a center line of the unworn region of the bore and generally orthogonal with respect to the plain of the turret. The centering of the boring bar with respect to the virgin or unworn portion of the worn bore provides the required reference for the re-boring and repair of the worn bore.

A rotary and feed drive unit is attached to the support structure on the upper turret to supply the rotation and feed for the boring bar secured thereto. The boring bar has at least one cutting edge that removes worn turret material from the sidewall of the bore as a result of one or more passes of the cutting edge down into the worn bore. During the cutting operation, no material is cut from the unworn region of the bore in that this region is used as a reference and has not been worn as a result of the punch press operation. The rotation of the boring bar with at least one cutting edge enlarges the diameter of the worn region of the bore.

Once the re-boring operation is completed, the boring bar and upper and lower supports are removed from the upper turret. The resulting bore includes a lip or shelf approximately one-half inch up from the bottom surface of the upper turret. The diameter of the portion of the bore which has been cut is greater than the diameter of the unworn region of the bore, thereby resulting in the shelf or lip within the bore. The center axis of each portion of the re-bored bore are colinear.

The concentricity of the re-bored portion of the bore with respect to the unworn or virgin region of the bore is then verified. Then a generally cylindrical sleeve, which has been cut and sized for the specific turret bore, is placed into the bore. The sleeve is manufactured from a hardened seamless tube of steel in one presently preferred embodiment of this invention. The sleeve is slipfit into the re-bored bore. The outside diameter of the sleeve and the inside diameter of the re-bored bore are within approximately 0.0005 inches of each other to enable the slipfit insertion thereof. No shrinking of the sleeve is required for its insertion into the bore as is often required for interference type fittings. A filler/adhesive may optionally be required for an enhanced fit between the sleeve and re-bored bore, or a non-metallic, ceramic, polymeric or other material can be optionally used as a liner in place of the sleeve according to this invention.

The bottom edge of the sleeve preferably does not rest upon the lip created between the re-bored portion of the bore and the unworn region but is supported by the flange juxtaposed to the upper surface of the turret. The sleeve preferably does not extend entirely through the bore. The inner diameter of the sleeve is sized to correspond to the diameter of the unworn region of the bore.

The inserted sleeve is secured to the turret with bolts extending through a flange around the upper edge of the sleeve. The bolts secure the flange to the upper surface of the turret and a bore gauge is preferably used to verify that the inside diameter of the sleeve is within appropriate tolerances with respect to the original and/or unworn bore diameter. After the sleeve is secured within the bore, a punch holder is manually inserted therein to verify proper installation after which test punching operations are performed.

A keyhole slot is often provided in the sidewall of the bore to ensure proper orientation of specifically configured dies and punches. The sleeve according to this invention may include an open channel corresponding to the location of the keyhole slot in the bore.

As a result of the refurbishing process of turret punch press bores according to this invention, proper alignment between the upper and lower turret bores is obtained without substantial dismantling of the punch press nor significant downtime required in replacing the turrets or other refurbishing methods. Furthermore, the refurbished bore including the sleeve provides a long-lasting, effective repair with the additional advantage that once the sleeve becomes worn, it can be removed and replaced by a new sleeve without additional cutting of the bore.

BRIEF DESCRIPTION OF THE DRAWINGS

The objectives and features of the invention will become more readily apparent from the following detailed description taken in conjunction with the accompanying drawings in which:

FIG. 1 is schematic representation of a turret punch press;

DETAILED DESCRIPTION OF THE INVENTION

Figure 2A:
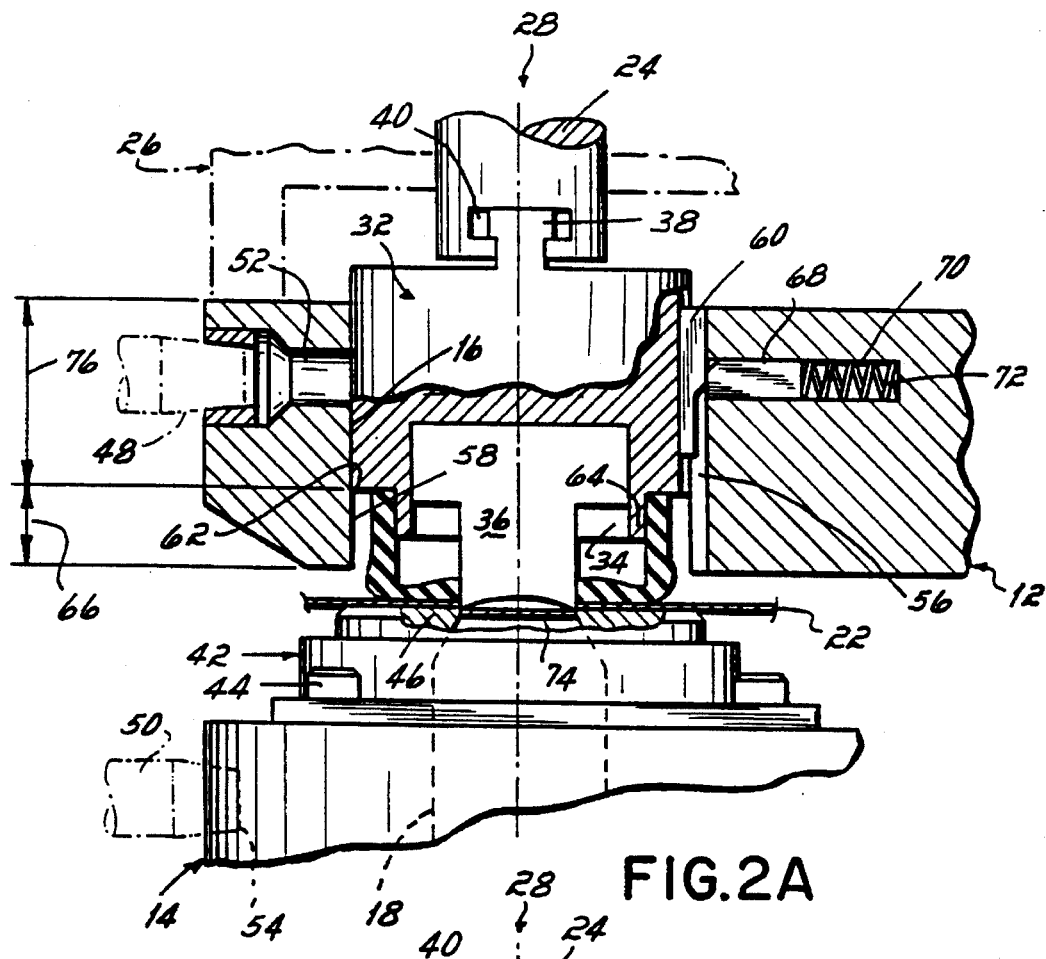
FIG. 2A is a cross-sectional view of an upper turret bore, punch holder and punch, work piece, and die holder and die of a turret punch press during a punching operation.

A turret punch press 10 is shown schematically in FIG. 1. The punch press 10 shown in the drawings and described herein is representative of a Wiedemann (Warner and Swasey) turret punch press. However, the present invention is readily applicable to other types of punch presses and machines and should not be limited only to Wiedemann turret punch presses.

Figure 2B:
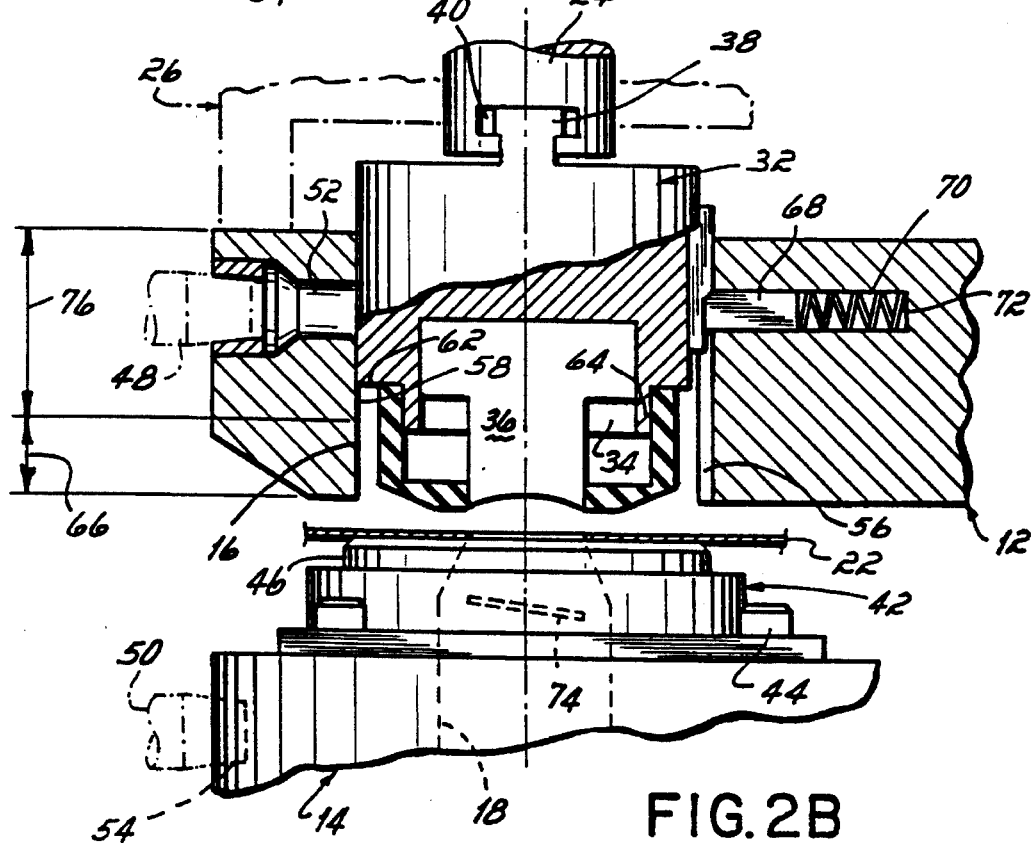
FIG. 2B is a view similar to FIG. 2A after the work piece has been punched.

The turret punch press 10 includes an upper generally circular turret 12 and a lower generally circular turret 14. Each turret 12, 14 is positioned generally horizontally and spaced one from another and has a plurality of varying sized bores proximate a perimeter edge of the turret. As shown in FIGS. 1, 2A and 2B, each bore 16 in the upper turret 12 has a corresponding bore 18 in the lower turret 14. The turret punch press 10 includes a worktable 20 for supporting a work piece 22 which during operation is positioned between the spaced turrets 12, 14. A ram 24 is mounted within a ram housing 26 for reciprocal generally vertical movement and acts upon the work piece 22 (FIGS. 2A and 2B) in order to punch, nibble, or generally sever a portion of the work piece 22 therefrom. The ram 24 is located at a punch station 28 of the turret punch press 10. The turret punch press 10 includes a tool change station 30 which is located approximately 90° from the punch station 28 in most Wiedemann turret punch presses and other similarly configured punch presses. The other components, parts and subsystems of a punch press 10 not described herein are readily known by those skilled in the art and are not described herein.

FIGS. 2A and 2B are cross-sectional schematic representations of a portion of the punch press 10 acting upon the work piece 22. The upper turret 12 includes the bore 16 extending therethrough which is aligned with the bore 18 in the lower turret 14. The work piece 22 is positioned between the turrets 12, 14. A punch holder 32 is slidably mounted within the bore 16 of the upper turret 12 for axial movement. A recess 34 is formed on the lower end of the punch holder 32 for retaining a punch 36. The upper end of the punch holder 32 has a T-shaped projection 38 thereon which is retained within a T-shaped slotted opening 40 in the lower end of the ram 24. The lower face of the punch 36 is specifically configured to produce a desired configuration in the work piece 22 when punched therethrough.

A die holder 42 is secured as by bolts or other appropriate fasteners 44 to an upper surface of the lower turret 14. The die holder 42 retains a die 46 on an upper portion thereof which is specifically configured to mate with the punch 26. The bore 18 in the lower turret 14 extends upwardly through the turret 14 and die holder 42.

An upper and a lower index pin 48, 50 respectively project into an upper and a lower index aperture 52, 54 respectively in the perimeter sidewall of the upper and lower turrets 12, 14 respectively. The index pins 48, 50 and index apertures 52, 54 cooperate to provide radial alignment between the upper and lower turrets 12, 14 and, therefore, the punch 36 and die 46 retained therein. When the desired punch 36 and die 46 are rotated to the punch station 28 so that the punch holder 32 is engaged by the ram 24, the upper and lower index pins 48, 50 project into the corresponding upper and lower index apertures 52, 54, respectively, to lock the upper and lower turrets 12, 14 in place and fix them relative to each other. In many punch presses, the index pins are located diametrically opposite from the punch station 28. Therefore, the index pin apertures 52, 54 adjacent the upper and lower bores 16, 18 correspond to upper and lower bores diametrically opposite from the punch station and this is reflected by showing the index pins in phantom lines in FIGS. 2A and 2B.

A keyway 56 extends axially within a sidewall 58 of the upper turret bore 16. The keyway 56 is designed and configured to mate with a punch holder retaining key 60 protruding from the sidewall of the punch holder 32. The punch holder 32 includes an annular shelf 62 on a lower edge thereof such that a base 64 is formed on the lower portion of the punch holder 32. The base 64 has a smaller diameter than the upper portion of the punch holder 32 or the bore 16. There is no sliding contact between the punch holder 32 and a lower region 66 of the bore sidewall 58 because the punch holder 32 does not project entirely through the bore 16 and the shelf 62 remains spaced from the lower edge of the bore 16 approximately one-half inch; however, the spacing between the shelf 62 and the lower edge of the bore 16 may be less than one-half inch depending upon the particular turret punch press.

A punch holder retainer 68 is biased by a spring 72 within a recessed bore 70 in the upper turret. The retainer 68 projects from the sidewall 58 of the upper turret bore 16 to contact the key 60 on the punch holder 32. As the ram 24 forces the punch holder 32 downwardly within the bore 16, the key 60 forces the dowel 68 to retract into the bore 70 in the turret 16 thereby compressing a spring 72. The keyway 56 extends the full length of the bore 16, but the key 60 does not extend the full length of the keyway 56 and bore 16. Once the punch stroke is completed and the ram 24 pulls the punch holder 32 upwardly in the bore 16, a bottom edge of the key 60 advances upwardly above the retainer 68 thereby permitting the spring 72 to expand and the dowel 68 to project through the sidewall 58 of the bore 16, thus insuring the T-shaped projection will align with the ram 24 and precluding the punch holder 32 from dropping from the turret 12 when the ram 24 is disengaged from the holder.

The configuration shown in FIG. 2A represents the punch holder 32 at its lowest point of travel within the bore 16 and the die 46 and punch 36 have punched a cutout 74 from the work piece 22. As can be seen in FIG. 2A, the punch holder 32 does not contact the sidewall 58 of the upper turret bore 16 in the lower region 66 of the bore 16. The shelf 62 is spaced from the lower edge of the base 16. As a result, wear within the bore 16 resulting from repeated punching operations is limited to an upper worn region 76 of the bore 16. The lower, unworn region 66 of the bore 16 is not contacted by the punch holder 32.

FIG. 2B shows the punch holder 32 and punch 36 being retracted upwardly in the bore 16 from the work piece 22 and the cutout 74 falling through the die 46 and die holder 42 and bore 18 in the lower turret 14. The punching operation described herein optimally requires precise axial alignment of the die 46 and die holder 42 in the lower turret 14, the punch 36 and punch holder 32 in the upper turret 12, and, to a lesser degree, the ram 24. The repeated and forceful axial motion of the punch holder 32 within the bore 16 in response to the reciprocal movement of the ram 24 produces nonuniform wear on the sidewall 58 of the bore 16 in the upper turret 12. Due to the repeated use of the bore 16 and the movement of the punch holder 32 therein, the bore 16 is worn so that the critical alignment between the punch holder 32 and the die holder 42 and ultimately the punch 36 and die 46 is diminished. The worn bore 16 fails to provide a rigid guide for the punch holder 32 and an inaccurate alignment of the punch 36 with the die 46 during the punching cycle. This results in poor work piece 22 quality and excess tool wear or breakage is possible. However, the wear to the upper bore 16 is limited to the upper region 76 of the bore 16 due to the configuration of the punch holder 32 and shelf 62 on the lower portion thereof. As a result, the lower approximately one-half inch of the bore 16 is unworn and maintains the configuration, dimension and centerline of the bore 16 as finally machined by the manufacturer according to the original specifications.

A presently preferred method for refurbishing a worn turret bore and refurbishing the axial misalignment between the punch holder 32 and punch 36 and the die 46 and die holder 42 as provided by the manufacturer is shown in FIGS. 3A–3E and 4. An initial step in the refurbishing of the worn upper turret bore 16 is the rotation of the bore 16 to be refurbished to the tool change station 30 of the punch press 10. In most Wiedemann turret punch presses, the tool change station 30 is located approximately 90° clockwise from the punch station 28. An advantage of locating the worn turret bore 16 to be repaired at the tool change station 30 as opposed to the punch station 28 is that the ram 24 and associated mechanisms do not need to be disassembled as is required in other turret repair procedures. Once the worn turret bore 16 is rotated to the tool change station 30, minor disassembly of the punch press 10 is preferable in order to provide for access to the worn bore 16 of the upper turret 12. For example, it is preferable to remove a portion of the work table 20 adjacent the tool change station 30 and a cover portion and various accessories of the ram 24 proximate the tool change station 30 in order to provide enhanced access and working room. These removed portions have been illustrated in phantom lines in FIG. 1.

Figure 3A:
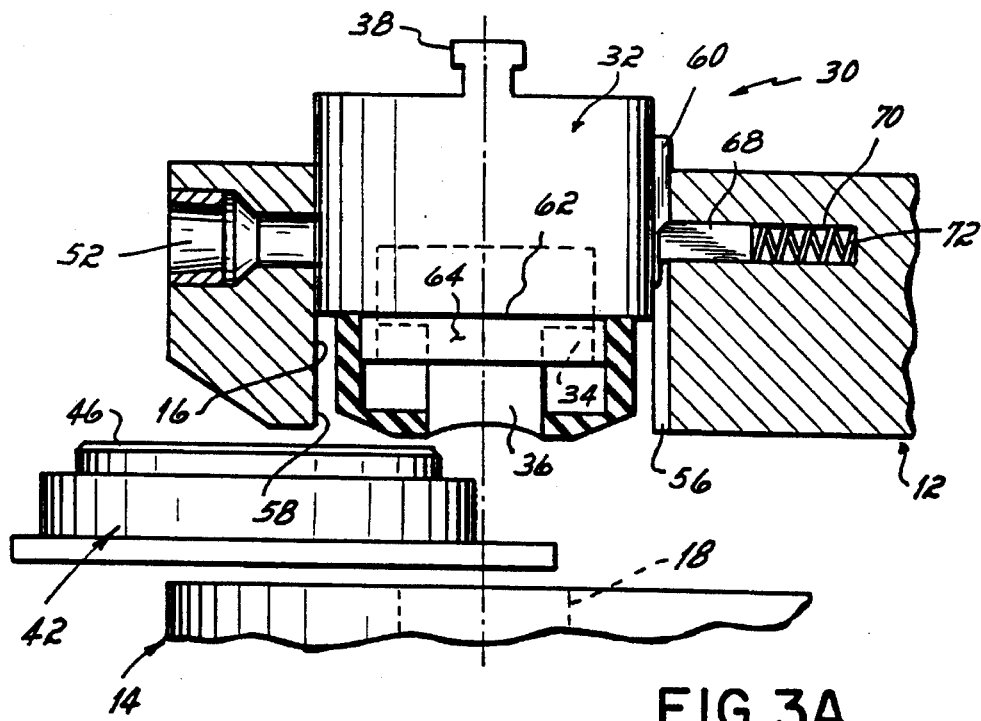
FIG. 3A is a cross-sectional view of an upper and lower turret bore after the turrets have been rotated from the punch station in which the die and die holder are being removed from the lower turret.

With the worn bore 16 rotated to the tool change station 30, the die 46 and die holder 42 are removed from the upper surface of the lower turret 14 as shown in FIG. 3A. The die holder 42 is typically secured to the lower turret 14 by one or more bolts 44 which are removed to free the die holder 42 from the lower turret 14.

Figure 3B:
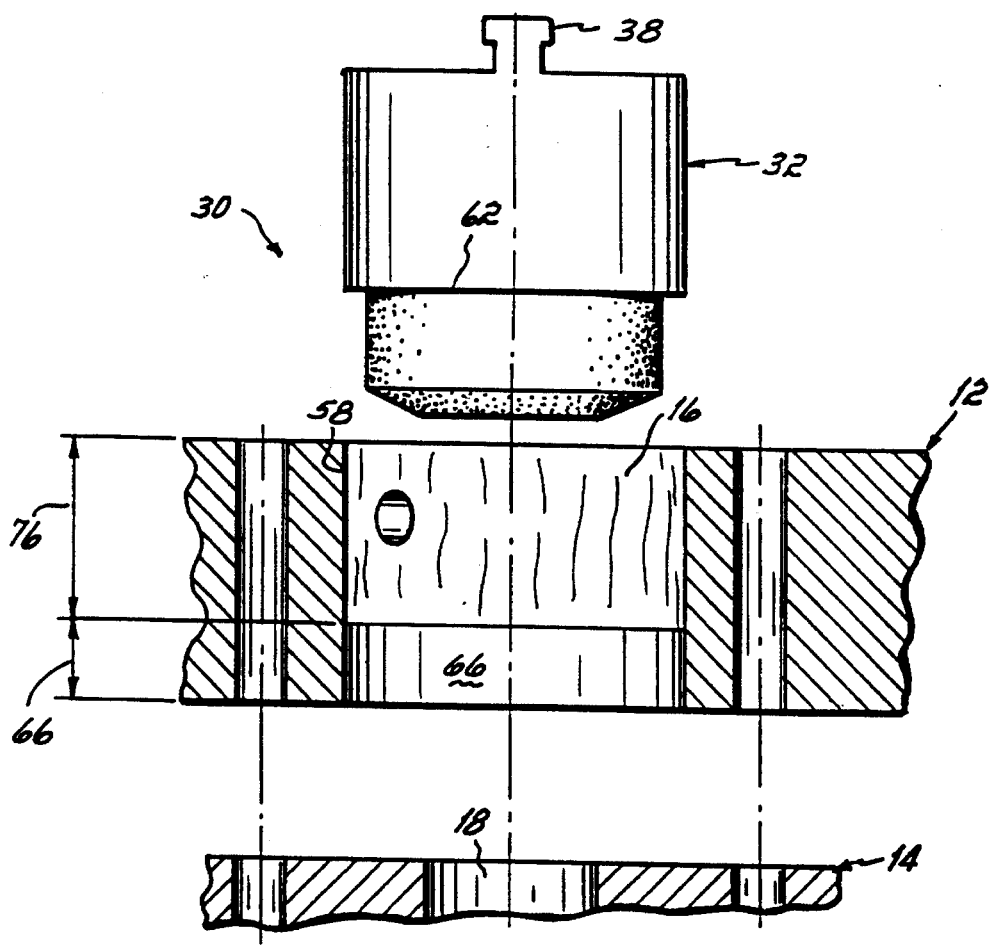
FIG. 3B is a cross-sectional view showing the worn and unworn portions of the upper turret bore.

Another preparatory step to refurbishing the worn turret bore 16 is shown in FIG. 3B in which the punch holder 32 and punch 36 are removed upwardly from the worn turret bore 16. Once the die holder 42 and die 46 and punch holder 32 and punch 36 are removed from the turrets 12, 14 access is more readily available to the turret 12 for the refurbishing process.

Figure 3C:
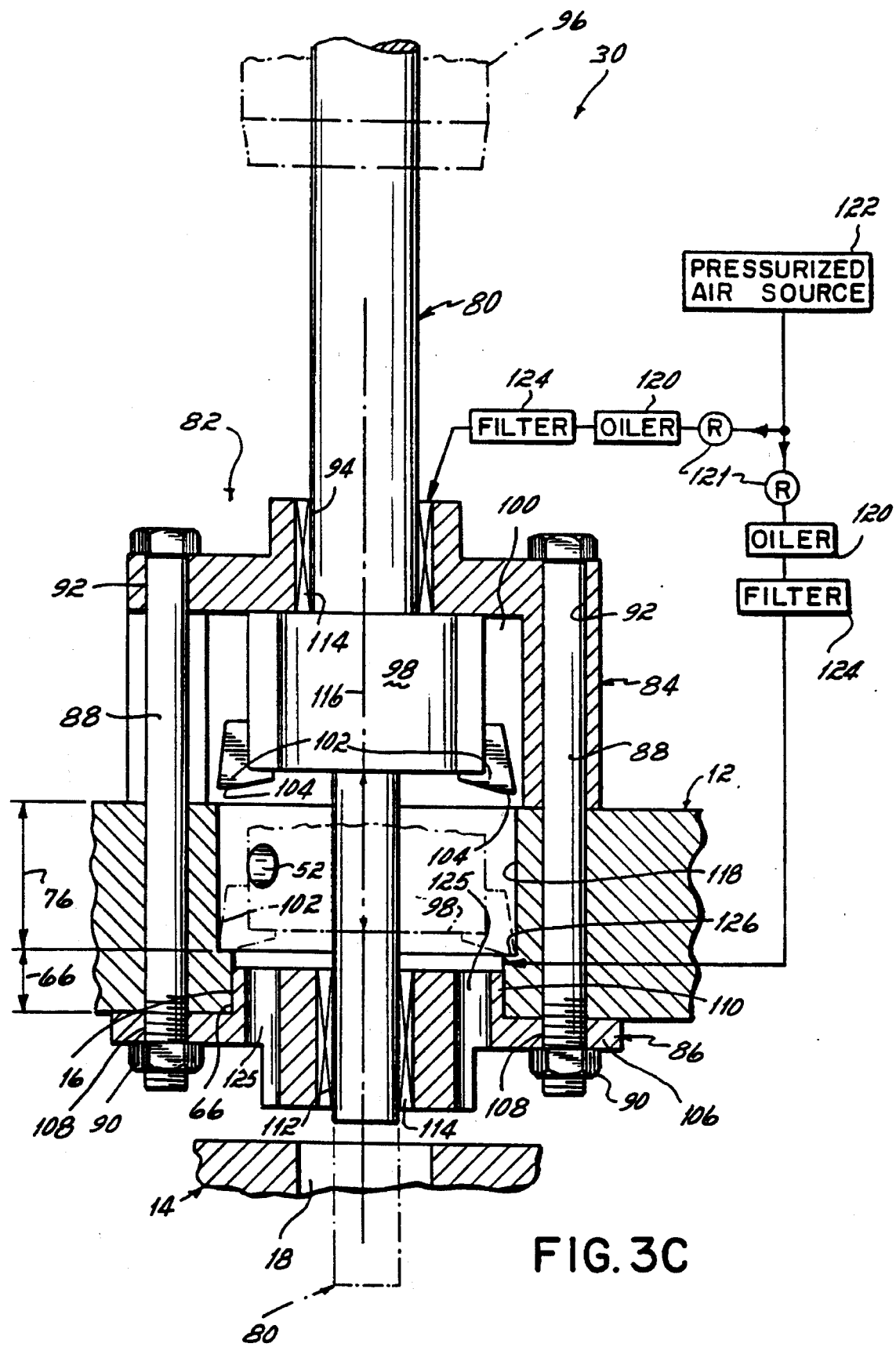
FIG. 3C is a cross-sectional view showing the upper turret being re-bored according to the method of this invention.

Referring to FIG. 3C, a boring bar 80 and support structure 82 are attached to the upper turret 12 in order to re-bore the worn bore 16. The support structure 82 includes an upper support 84 secured to the upper surface of the upper turret 12 and a lower support 86 secured to the lower surface of the upper turret 12. As shown in FIG. 3C, a pair of bolts 88 extend longitudinally through holes aligned in the upper support structure 84, the turret 12 and the lower support structure 86, respectively, to sandwich the turret 12 between the upper and lower supports in one presently preferred embodiment of the invention. The bolts 88 are secured as by nuts 90 or another appropriate fastener can be used according to this invention. It will be appreciated by one of ordinary skill in the art that another means for securing the boring bar 80 to the upper turret 12 are possible and should be considered within the scope of this invention.

The upper support 84 has a generally U-shaped crosssectional configuration in which the bolts 88 extend longitudinally through holes 92 in the legs on each side of the U-shaped upper support 84. The opening 85 provided by this U-shaped support provided access to a cavity 100 for tool maintenance and adjustment. A through hole 94 is provided in the middle of the U-shaped upper support 84 through which the boring bar 80 projects and is supported. The boring bar 80 extends axially through the upper support 84, the bore 16 and the lower support 86 and is connected to a drill 96 or other rotary feed/drive unit at an upper end of the bar 80. A generally cylindrical holder 98 is secured to the cylindrical boring bar 80 within a cavity 100 of the upper support 84. Attached to a lower edge of the holder 98 are a plurality, in a presently preferred embodiment of the invention three boring tools 102 project from a bottom edge of the holder 98. Each drill bit 102 includes a cutting surface 104 on the lower edge thereof. It will be appreciated that other than three boring tools 102 can be used in the re-boring process according to this invention and the most efficient means should be employed which will vary depending upon the particular punch press.

The lower support 86 includes a pair of flanges 106 with holes 108 through which the bolt 88 secure the lower support 86 to the lower surface of the turret 12. The lower support 86 also includes an upwardly projecting boss 110 which is inserted into the lower portion 66 of the bore 16 and secured to the turret 12. The boss 110 is sized to correspond to the original diameter of the bore 16, which is the diameter of the unworn region 66 at the lower end of the bore 16 into which the boss 110 projects as shown in FIG. 3C. A lower portion of the boring bar 80 projects through the turret bore 16 and through an aperture 112 in the boss 110 and the lower support 86. A ball, sleeve or other low friction bearing 114 is provided in the sidewalls of the boring bar apertures 94, 112 in the upper and lower supports 84, 86 respectively to permit reduced frictional rotation and minimize longitudinal movement of the boring bar 80 within the upper and lower supports 84, 86 while still maintaining the position of the boring bar 80 along a centerline axis 116 of the unworn region 66 of the turret bore 16. The boring bar 80 is positioned along the centerline axis 116 of the unworn region 66 of the turret bore 16 because it is inserted through the aperture 112 and boss 110 in the lower support 86 which are also centered on the centerline 116. Each variously sized bore has a correspondingly sized support structure 82 and tool holder 98 for use according to the presently preferred embodiment of this invention. Therefore, the centerline 116 of the unworn region 66 of the bore 16 is used as a reference as a result of the boss 110 on the lower support 86 positioning the boring bar 80. Likewise, the boring bar 80 is supported by the upper support 84 which is fixedly secured to the turret 12 to maintain the boring bar 80 along the centerline 116.

To refurbish the worn region 76 of the bore 16, the boring bar 80 is rotated by the drill rotary drive feed unit 96 and then translated downwardly through the bore 16. The rotation and translation of the drill bits 102 on the holder 98 of the boring bar 80 cuts a portion 118 of the sidewall 58 of the bore 16 thereby removing the worn portion 76 of the bore 16 and enlarging the diameter of this portion of the bore. As the holder 98 advances into the bore 16, the lower end of the boring bar 80 projects from the lower support 86 and into the bore 18 in the lower turret 14 as shown in phantom lines in FIG. 3C. During the cutting operation, oil or another lubricant 120 is preferably pressurized from an air source 122, regulated by a regulator 121 and processed through a filter 124 and then injected into the support structure 82. Preferably, the oil 120 is injected into regions just above the upper and lower support 84, 86 as indicated in FIG. 3C. The oil or other lubricant 120 decreases wear on the tools 102 and cutting surfaces 104 during the re-boring process and aids in the removal of chips (not shown) of the enlarged bore 118. These chips are forced by pressure through bores 125 of the support 86.

In a preferred embodiment according to this invention, the unworn region 66 of the turret bore 16 is not re-bored or cut. Only the upper, worn portion 76 of the bore sidewall 58 is re-bored according to this invention as shown at 118 of FIG. 3C. The tools 102 and cutting surfaces 104 are not advanced entirely through the bore 16 and the lower, unworn approximately one-half of the bore 16 remains uncut. As a result, a lip or shelf 126 is cut into the sidewall 58 of the bore 16. The re-bored portion 118 of the bore 16 has a larger diameter than the unworn uncut region 66 at the lower portion of the bore 16. In one presently preferred embodiment of this invention, the re-bored or cut portion 118 of the bore 16 is approximately 1/16 inches larger in diameter than the unworn region 66 or original diameter of the bore.

Once the cutting process is completed, the bolts 88 or other appropriate fasteners are removed and the boring bar 80, drill 96 and support structure 82 can be disassembled and removed from the turret 12.

In the re-boring process according to this invention, only the upper turret 12 is used as a reference and the lower turret 14, lower turret bore 18, and the ram 24 are not required to produce an upper turret bore which is refurbished to the original manufactured condition or specifications with respect to axial alignment.

After the boring bar 80 and support structure 82 are removed from the upper turret 12, a sleeve 128 is slipfit into the rebored bore 16 according to the presently preferred embodiment of this invention. Preferably, the concentricity of the re-bored or cut portion 118 of the bore 16 with respect to the unworn region 66 of the bore 16 is verified prior to inserting the sleeve 128 therein. This can be done with a tram or other appropriate gauge as is well known by one of ordinary skill in the art.

Figure 3D:
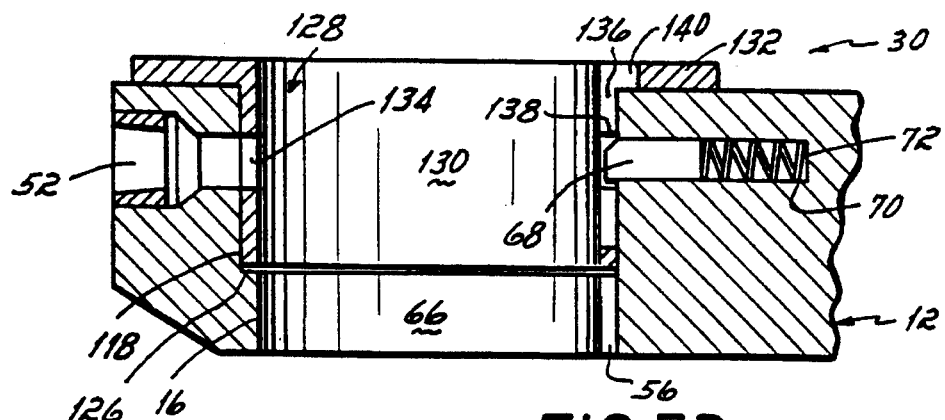
FIG. 3D is a cross-sectional view of a re-bored upper turret bore with a sleeve inserted therein.
Figure 3E:
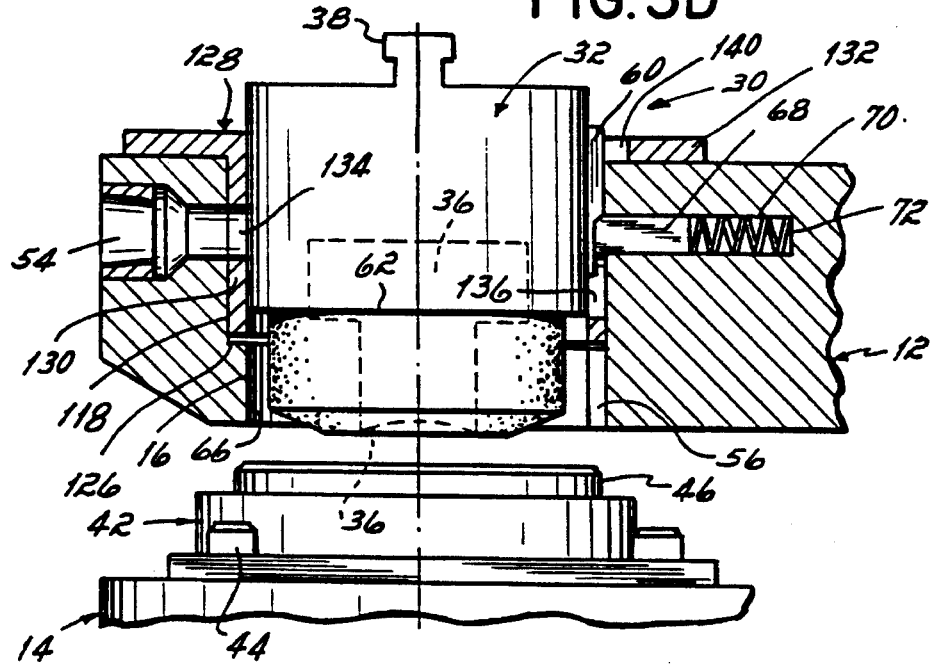
FIG. 3E is a cross-sectional view of the refurbished upper turret bore with the sleeve and punch holder inserted therein.
Figure 4:
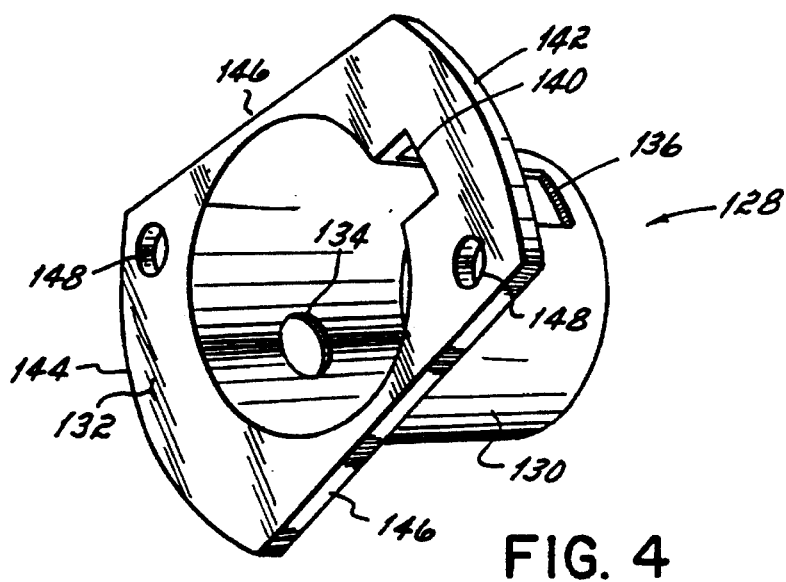
FIG. 4 is a top perspective view of a sleeve which is to be inserted into a refurbished upper turret bore.

The sleeve 128 as shown in FIGS. 3D, 3E and 4 includes a generally cylindrical tubular portion 130 and a generally planar flange 132 on an upper edge of the sleeve 128. The sleeve 128 is preferably manufactured from a hardened seamless tube of the steel having a wall thickness of about 1/16 inches in one presently preferred embodiment of this invention. The sleeve 128 is specially machined and configured for each particular bore configuration. The outside diameter of the tube 130 is machined to be approximately 0.0005 to 0.0010 inches less than the diameter of the cut or rebored portion 118 of the bore in order to enable a slipfit insertion of the sleeve 128 into the bore 16 in a presently preferred embodiment of the invention. The inner diameter of the tube 130 is preferably about equal to the diameter of the unworn region 66 at the lower portion of the bore 16. The length of the tube 130 should be less than the depth of the cut portion 118 of the bore 16 so that a lower edge of the tube 130 does not contact or is at least spaced from the lip 126 in the sidewall 58 of the bore 16 as shown in FIGS. 3D and 3E. The tube 130 is preferably manufactured from a seamless tube so as to maintain the tolerances required of the sleeve insert and to avoid manufacturing and/or configurational variations associated with a seam in the cylindrical portion of the tube.

Preferably a hole 134 is provided in the sidewall at the outer region of the cylindrical portion of the tube 130 to facilitate the repair, replacement, insertion or removal of the retractable pin 68 and/or the spring 72. Similarly, an open channel 136 is formed longitudinally on an inner portion of the tube 130 to mate with the keyway 56 in the bore 16 and the key 60 in the punch holder 32. In addition, an enlarged region 138 of the open channel 136 may preferably be provided to accommodate the insertion of the spring biased retainer 68 projecting into the bore 16.

The open channel 136 terminates short of the bottom edge of the tube 130 at approximately three quarters of an inch in one preferred embodiment of the sleeve 128 in this invention. This is due to the fact that the key 60 does not extend entirely through the bore 16 during a punching sequence. Additionally, terminating the open channel 136 in the sleeve 128 short of the bottom edge of the tube 130 adds increased rigidity and structural integrity to the sleeve 128. Alternatively, the channel 136 may extend the length of the tube 130 if the keyway of other types of turret punch presses have keys that extend through the turret 12. A notch 140 is preferably provided in 15 the flange 132 at the upper edge of the tube 130 to cooperate with the open channel 136 in order to accommodate the key 60 in the punch holder 32.

In many turret punch presses, the bores are closely positioned with respect to each other near the perimeter of the turrets. Therefore, the flange 132 on the upper edge of the tube 130 has a tapered or wedge shaped configuration in which a portion 142 directed inwardly toward the center of the turret 12 is more narrow than a portion 144 directed outwardly proximate the perimeter of the turret 12 as shown in FIG. 4. The side edges 146 of the flange 132 are generally straight to connect the semi-circular narrow 142 and wider 144 regions of the flange 132. As a result, immediately adjacent bores in the turret can be repaired according to this invention with the insertion of the sleeve having a tapered flange configuration as shown in FIG. 4 without interference or obstruction between the adjacent sleeves, flanges and refurbished bores.

Apertures 148 in the flange 132 are provided, preferably diametrically opposite from each other, to secure the flange 132 to an upper surface of the upper turret 12 as shown in Figs, 3D and 3E. The flange 132 is juxtapositioned to the upper surface of the turret 12 when the sleeve 128 is inserted into the re-bored bore 16. An additional filler/adhesive, such as a Loctite product may be advantageously used for an enhanced fit and insertion of the sleeve 128 into the re-bored bore 16. It will be appreciated that a liner, insert or sleeve of other configurations and/or materials can be used according to this invention.

Referring to FIG. 3E, after the portion 118 of the worn region 76 of the bore 16 has been cut away and the sleeve 128 inserted into the re-bored bore, the die 46 and die holder 42 are mounted on the upper surface of the lower turret 14. The punch holder 32 is then manually inserted into the sleeve 128 to verify proper installation of the sleeve 128 and measurements can be taken to verify the alignment of the refurbished bore and sleeve 128 with respect to the unworn region 66 of the bore 16.

Once the refurbishing process according to this invention is completed, the refurbished bore can be used for operational punching of the work piece 22. However, over time, the sleeve 128 may also become worn just as the original bore. Advantageously, the sleeve 128 can be unbolted or removed from the turret 12 and a replacement sleeve easily slipfit into the bore 16 for subsequent repairs. As a result, subsequent refurbishing of the turret bore 16 is accomplished without the need for re-boring or cutting of the bore 16 resulting in an even more efficient, economical, and effective repair of the bore.

As a result of the refurbishing process of turret punch press bores according to this invention, proper alignment between the upper and lower turret bores is obtained without significant dismantling of the punch press 10 or downtime required in replacing the turrets 12, 14 entirely or other refurbishing methods. Furthermore, the refurbished bore including the sleeve 128 provides a long lasting, effective repair with the additional advantage that once the sleeve 128 itself becomes worn, it can be removed and replaced by a new sleeve without additional cutting of the bore.

From the above disclosure of the general principles of the present invention and the preceding detailed description of preferred embodiments, those skilled in the art will readily comprehend the various modifications to which the present invention is susceptible. For example, alternative configurations for the sleeve, support structure or boring bar can be contemplated within the scope of this invention, Therefore, I desire to be limited only by the scope of the following claims and equivalents thereof.

I claim:

1. A method of repairing a worn bore in a turret of a punch press, said method comprising:

detecting an unworn region of the bore in the turret, said unworn region having a centerline;

cutting a worn portion of a sidewall of the bore so that a centerline of said cut portion is generally collinear with said unworn region centerline;

providing a cylindrical sleeve having an outer diameter sized to fit within said cut portion of the bore and an inner diameter approximately equal to a diameter of said unworn region;

inserting said sleeve into the bore; and securing said sleeve in the bore and to the turret of the punch press.

2. The method of claim 1 further comprising:

positioning the turret so that the bore is at a position away from a punch station of the punch press.

3. The method of claim 2 wherein said worn bore is positioned at a tool change station of the punch press.

4. The method of claim 1 wherein said cutting is limited to a worn region of the bore and produces a lip in said sidewall of the bore, said cut portion of the bore having a greater diameter than said unworn region of the bore.

5. The method of claim 4 wherein said sleeve is inserted such that a bottom edge of said sleeve is spaced from said lip.

6. The method of claim 1 wherein said sleeve is secured to the turret by a fastener inserted through a flange on an upper edge of said sleeve, said fastener being inserted through said flange and into an upper surface of the turret to thereby secure said sleeve in the bore.

7. The method of claim 1 wherein said sleeve is releasably secured in the bore so that said sleeve can be removed from the bore and replaced with another sleeve.

8. The method of claim 1 further comprising:

securing a support structure to the turret, said support structure positioning a boring bar with respect to said unworn region centerline, said boring bar having cutting surfaces;

rotating said boring bar; and translating said rotating boring bar into the bore so that said cutting surfaces cut said portion of said sidewall of the bore.

9. The method of claim 8 wherein said support structure is secured only to the turret containing the bore being repaired.

10. The method of claim 1 further comprising:

injecting a lubricant into the bore during said cutting.

11. The method of claim 1 further comprising:

verifying the concentricity of the cut portion of the bore with respect to the unworn region of the bore.

12. The method of claim I wherein said sleeve is inserted by a slip-fit between said sleeve and said cut portion of the bore.

13. The method of claim 1 further comprising:

aligning a channel in said sleeve with a key way slot formed into said sidewall of the bore.

14. The method of claim 1 further comprising:

removing a die and a die holder from a bore in a lower turret, said lower turret bore corresponding to the worn bore.

15. A method of repairing a worn bore in a turret of a punch press, said method comprising:

positioning the turret so that the bore is at a tool change station of the punch press away from a punch station;

detecting an unworn region of the bore in the turret, said unworn region having a centerline;

securing a support structure to the turret, said support structure positioning a boring bar with respect to said unworn region centerline, said boring bar having cutting surfaces;

rotating said boring bar;

cutting the bore by translating said rotating boring bar into the bore so that said cutting surfaces cut a worn portion of a sidewall of the bore, a centerline of said cut portion being generally collinear with said unworn region centerline, said cut portion having a larger diameter than said unworn region thereby producing a lip in said sidewall of said bore;

providing a cylindrical sleeve having an outer diameter sized to fit within said cut portion of the bore and an inner diameter approximately equal to a diameter of said unworn region, said sleeve having a flange on an upper edge thereof;

inserting said sleeve into the bore so that a lower edge of said sleeve is spaced from said lip and said flange is juxtapositioned on an upper surface of the turret; and securing said sleeve in the bore and to the turret by a fastener inserted through said flange and into said upper surface of the turret.

16. The method of claim 15 wherein a lower support is secured to a lower surface of the turret and an upper support is secured to said upper surface of the turret to support said boring bar, said lower support having a boss positioned within said unworn region of the bore and a lower end of said boring bar being inserted within an aperture in said boss to accurately position said boring bar with respect to said unworn region centerline.

17. The method of claim 15 wherein said sleeve is releasably secured in the bore so that said sleeve can be removed from the bore and replaced with another sleeve.

18. The method of claim 15 wherein said support structure is secured only to the turret containing the bore being repaired.

19. The method of claim 15 further comprising:

injecting a lubricant into the bore during said cutting.

20. The method of claim 15 further comprising:

verifying the concentricity of the cut portion of the bore with respect to the unworn region of the bore.

21. The method of claim 15 wherein said sleeve is inserted by a slip-fit between said sleeve and said cut portion of the bore.

22. The method of claim 15 further comprising:

aligning a channel in said sleeve with a key way slot formed into said sidewall of the bore.

23. The method of claim 15 further comprising:

removing a die and die holder from a bore in a lower turret, said lower turret bore corresponding to the worn bore.

24. A method of refurbishing a bore in an upper turret of a punch press, a punch holder being positioned during operation within said upper turret bore for reciprocal movement therein, said punch holder cooperating with a die holder in a corresponding bore in a lower turret of said punch press to punch a work piece positioned between said turrets, said upper turret bore being worn so that said punch holder does not maintain axial alignment with respect to said die holder during reciprocal movement within said upper turret bore, said method comprising:

detecting an unworn region of the upper turret bore; and repairing the upper turret bore with reference to said unworn region so that the said repaired upper turret bore maintains the punch holder and punch in axial alignment with respect to said unworn region during reciprocal movement within said repaired upper turret bore.

25. The method of claim 24 wherein said repairing comprises providing a liner in said upper turret bore.

* * * * *

UNITED STATES PATENT AND TRADEMARK OFFICE
CERTIFICATE OF CORRECTION

PATENT NO. :   5,471,730
DATED      :   December 5, 1995
INVENTOR(S) :  Mark Sackett It is certified that error appears in the above-indentified patent and that said Letters Patent is hereby corrected as shown below:

Column 1, Line 22, "and the bore" should read --and within the bore--.

Column 1, Lines 60-61, "940,000 to 965,000" should read --$40,000 to $65,000--.

Column 2, Line 9, "of the press" should read --of the punch press--.

Column 9, Lines 57-58, "crosssectional" should read --cross-sectional--.

Column 12, Line 10, "in 15 the flange" should read --in the flange--.

Signed and Sealed this

Nineteenth Day of March, 1996

BRUCE LEHMAN

Attest:

Attesting Officer

Commissioner of Patents and Trademarks